US012783873B2

(12) United States Patent
Pezeshki et al.

(10) Patent No.: US 12,783,873 B2
(45) Date of Patent: Nov. 3, 2026

(54) REPORTING FOR MACHINE LEARNING MODEL UPDATES

(71) Applicant: QUALCOMM Incorporated, San Diego, CA (US)

(72) Inventors: Hamed Pezeshki, San Diego, CA (US); Tao Luo, San Diego, CA (US); Taesang Yoo, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 958 days.

(21) Appl. No.: 17/694,467

(22) Filed: Mar. 14, 2022

(65) Prior Publication Data

US 2022/0335294 A1 Oct. 20, 2022

Related U.S. Application Data

(60) Provisional application No. 63/177,180, filed on Apr. 20, 2021.

(51) Int. Cl.
*G06N 3/08* (2023.01)
*H04W 16/22* (2009.01)

(52) U.S. Cl.
CPC .............. *G06N 3/08* (2013.01); *H04W 16/22* (2013.01)

(58) Field of Classification Search
CPC ................................ G06N 3/08; H04W 16/22
See application file for complete search history.

(56) References Cited

U.S. PATENT DOCUMENTS 10,817,783 B1 10/2020 Rotem et al.
12,072,954 B1 * 8/2024 Li ....................... G06F 18/2148
2020/0293870 A1 * 9/2020 Isikdogan ............ G06N 3/0464
2021/0110261 A1 4/2021 Lee et al.
(Continued)

FOREIGN PATENT DOCUMENTS

CN 108154239 A * 6/2018 ............ G06N 20/00
CN 111566673 A 8/2020
CN 111611610 A 9/2020
(Continued)

OTHER PUBLICATIONS

"Chong et al., Partially Trained Neural Networks based on Partition of Unity, published 1992" (Year: 1992).*
(Continued)

*Primary Examiner* — David Yi
*Assistant Examiner* — Syed Rayhan Ahmed
(74) *Attorney, Agent, or Firm* — Seyfarth Shaw LLP

(57) ABSTRACT

A receiver receives, from a transmitter, a reference neural network. The receiver trains the reference neural network to obtain updated neural network parameters for the reference neural network. The receiver reports to the transmitter in response to a trigger, a difference between the updated neural network parameters and previous neural network parameters for the reference neural network. The trigger may be based on a loss function, a magnitude of the difference between the updated neural network parameters and the previous neural network parameters, and/or a difference between performance of the reference neural network with the updated neural network parameters and performance of the reference neural network with the previous neural network parameters.

22 Claims, 9 Drawing Sheets

(56) References Cited

U.S. PATENT DOCUMENTS

| | | | | |
|---|---|---|---|---|
| 2022/0092411 | A1* | 3/2022 | Shin | G06N 3/0475 |
| 2023/0259789 | A1* | 8/2023 | Wang | G06N 3/082<br>706/25 |

FOREIGN PATENT DOCUMENTS

| | | | | |
|---|---|---|---|---|
| WO | 2019185981 | A1 | 10/2019 | |
| WO | 2019206196 | A1 | 10/2019 | |
| WO | WO-2019234291 | A1 * | 12/2019 | G06N 3/045 |
| WO | 2020064093 | A1 | 4/2020 | |
| WO | WO-2022120737 | A1 * | 6/2022 | G06N 3/088 |

OTHER PUBLICATIONS

International Search Report and Written Opinion—PCT/US2022/020355—ISA/EPO—Jul. 15, 2022.

Mcmahan H B., et al., "Communication-Efficient Learning of Deep Networks from Decentralized Data", arXiv:1602.05629v4, Feb. 17, 2016, 11 Pages.

Ribero M., et al., "Communication-Efficient Federated Learning via Optimal Client Sampling", arXiv:2007.15197v2, Oct. 16, 2020, 27 Pages.

* cited by examiner

REPORTING FOR MACHINE LEARNING MODEL UPDATES

CROSS-REFERENCE TO RELATED APPLICATION

The present application claims the benefit of U.S. Provisional Patent Application No. 63/177,180, filed on Apr. 20, 2021, and titled "REPORTING FOR MACHINE LEARNING MODEL UPDATES," the disclosure of which is expressly incorporated by reference in its entirety.

FIELD OF THE DISCLOSURE

Aspects of the present disclosure generally relate to wireless communications, and more particularly to techniques and apparatuses for triggering reporting for, such as differential machine learning model updates.

BACKGROUND

Wireless communications systems are widely deployed to provide various telecommunications services such as telephony, video, data, messaging, and broadcasts. Typical wireless communications systems may employ multiple-access technologies capable of supporting communications with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and long term evolution (LTE). LTE/LTE-Advanced is a set of enhancements to the universal mobile telecommunications system (UMTS) mobile standard promulgated by the Third Generation Partnership Project (3GPP).

A wireless communications network may include a number of base stations (BSs) that can support communications for a number of user equipment (UEs). A user equipment (UE) may communicate with a base station (BS) via the downlink and uplink. The downlink (or forward link) refers to the communications link from the BS to the UE, and the uplink (or reverse link) refers to the communications link from the UE to the BS. As will be described in more detail, a BS may be referred to as a Node B, a gNB, an access point (AP), a radio head, a transmit receive point (TRP), a new radio (NR) BS, a 5G Node B, and/or the like.

The above multiple access technologies have been adopted in various telecommunications standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation.

Artificial neural networks may comprise interconnected groups of artificial neurons (e.g., neuron models). The artificial neural network may be a computational device or represented as a method to be performed by a computational device. Convolutional neural networks, such as deep convolutional neural networks, are a type of feed-forward artificial neural network. Convolutional neural networks may include layers of neurons that may be configured in a tiled receptive field. It would be desirable to apply neural network processing to wireless communications to achieve greater efficiencies.

SUMMARY

According to aspects of the present disclosure, a method receives, from a transmitter, a reference neural network. The method also trains the reference neural network to obtain updated neural network parameters for the reference neural network. The method further reports to the transmitter in response to a trigger, a difference between the updated neural network parameters and previous neural network parameters for the reference neural network.

In other aspects of the present disclosure, an apparatus for wireless communications includes at least one processor and memory coupled with the processor(s). Instructions stored in the memory are operable, when executed by the processor (s), to cause the apparatus to receive from a transmitter, a reference neural network. The apparatus can also train the reference neural network to obtain updated neural network parameters for the reference neural network. The apparatus can further report to the transmitter in response to a trigger, a difference between the updated neural network parameters and previous neural network parameters for the reference neural network.

In other aspects of the present disclosure, an apparatus for wireless communication by a receiver includes means for receiving, from a transmitter, a reference neural network. The apparatus also includes means for training the reference neural network to obtain updated neural network parameters for the reference neural network. The apparatus further includes means for reporting to the transmitter in response to a trigger, a difference between the updated neural network parameters and previous neural network parameters for the reference neural network.

In other aspects of the present disclosure, a non-transitory computer-readable medium with program code recorded thereon is disclosed. The program code is executed by an apparatus and includes program code to receive, from a transmitter, a reference neural network. The apparatus also includes program code to train the reference neural network to obtain updated neural network parameters for the reference neural network. The apparatus further includes program code to report to the transmitter in response to a trigger, a difference between the updated neural network parameters and previous neural network parameters for the reference neural network.

Aspects generally include a method, apparatus, system, computer program product, non-transitory computer-readable medium, user equipment, base station, wireless communication device, and processing system as substantially described with reference to and as illustrated by the accompanying drawings and specification.

The foregoing has outlined rather broadly the features and technical advantages of examples according to the disclosure in order that the detailed description that follows may be better understood. Additional features and advantages will be described. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that features of the present disclosure can be understood in detail, a particular description may be had by reference to aspects, some of which are illustrated in the appended drawings. It is to be noted, however, that the appended drawings illustrate only certain aspects of this disclosure and are therefore not to be considered limiting of its scope, for the description may admit to other equally effective aspects. The same reference numbers in different drawings may identify the same or similar elements.

DETAILED DESCRIPTION

Figure 1:
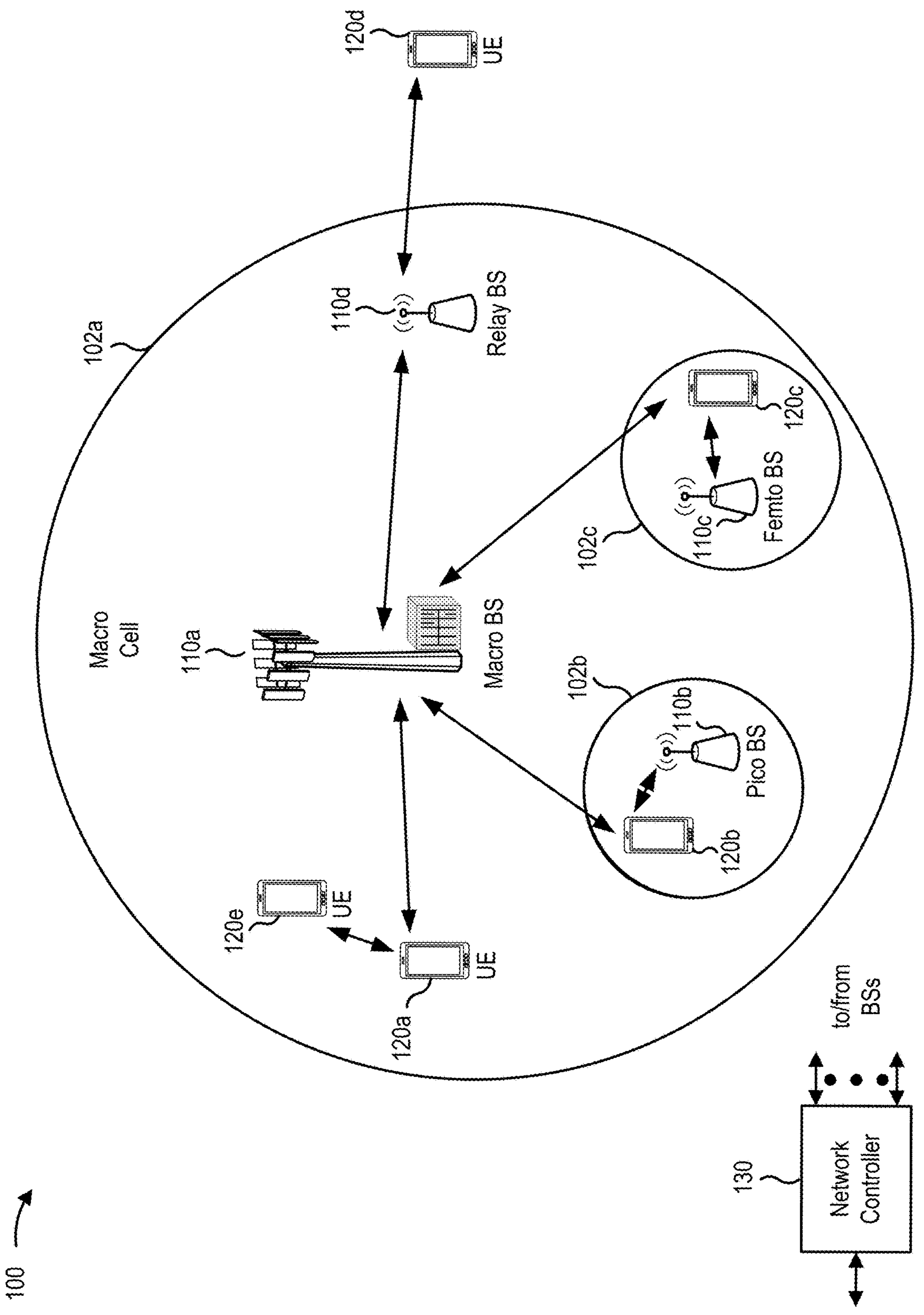
FIG. 1 is a block diagram conceptually illustrating an example of a wireless communications network, in accordance with various aspects of the present disclosure.

Various aspects of the disclosure are described more fully below with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method, which is practiced using other structure, functionality, or structure and functionality in addition to or other than the various aspects of the disclosure set forth. It should be understood that any aspect of the disclosure disclosed may be embodied by one or more elements of a claim.

Several aspects of telecommunications systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described using terminology commonly associated with 5G and later wireless technologies, aspects of the present disclosure can be applied in other generation-based communications systems, such as and including 3G and/or 4G technologies.

A machine learning (ML) model, such as a deep convolutional network, may be generated at a network and then transmitted to a user equipment (UE) for further training. Although the present description primarily discusses the model originating at the network, (sometimes referred to as a base station or gNB), the present disclosure contemplates the opposite. That is, the present disclosure also is intended to cover the base station sending model updates to the UE for a UE originated model.

A large amount of data is involved when exchanging parameters of the trained neural network between UEs and a network. In some cases, the size of a neural network may be very large, and it may not be possible and/or efficient for the UE to upload the whole trained artificial intelligence (AI) module with each update.

Aspects of the present disclosure reduce over-the-air transmissions needed for a machine learning model update. In some aspects of the present disclosure, the base station may explicitly ask the UE to train and report only "a part" of a pre-trained neural network (NN), as opposed to the whole neural network.

Aspects of the present disclosure are directed to a UE or base station sending an updated neural network in a differential manner based on a triggering event. A UE may report model changes over time, as the UE updates the machine learning model, as opposed to reporting the whole neural network at each model update instance. The subsequent model updates may be based on a differential model upload with respect to a reference model (e.g., pre-trained model sent by the network or a first pre-trained model sent by the UE to the network).

According to aspects of the present disclosure, a triggering condition for the differential model update may be based on a loss function for training the neural network. For example, if the loss function decreases below a threshold or the rate of decrease of the loss function drops below a threshold, a model update may be triggered. That is, if an amount of fine tuning during training becomes small enough that the network is no longer changing much during training, the updates may be ready for sending. Thus, the UE may transmit a scheduling request to receive a resource allocation for transmission of the update.

In other aspects, the triggering condition may be a function of an amount of change in the transmitted parameters of the neural network. This change metric may be measured, for example, in terms of an L1-norm or L2-norm of the difference between the current and previously reported neural network parameters. This change in the parameters is relevant as long as the change translates into change in the overall performance of the neural network. In other words, the update should occur when a change in parameters is significant enough to affect network performance by some threshold amount. According to aspects of the present disclosure, when the UE sends an update, the UE transmits a scheduling request to receive an allocation of resources for transmitting the update.

FIG. 1 is a diagram illustrating a network 100 in which aspects of the present disclosure may be practiced. The network 100 may be a 5G or NR network or some other wireless network, such as an LTE network. The wireless network 100 may include a number of BSs 110 (shown as BS 110*a*, BS 110*b*, BS 110*c*, and BS 110*d*) and other network entities. A BS is an entity that communicates with user equipment (UEs) and may also be referred to as a base station, a NR BS, a Node B, a gNB, a 5G node B (NB), an access point, a transmit receive point (TRP), and/or the like. Each BS may provide communications coverage for a particular geographic area. In 3GPP, the term "cell" can refer to a coverage area of a BS and/or a BS subsystem serving this coverage area, depending on the context in which the term is used.

A BS may provide communications coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). A BS for a macro cell may be referred to as a macro BS. A BS for a pico cell may be referred to as a pico BS. A BS for a femto cell may be referred to as a femto BS or a home BS. In the example shown in FIG. 1, a BS 110*a* may be a macro BS for a macro cell 102*a*, a BS 110*b* may be a pico BS for a pico cell 102*b*, and a BS 110*c* may be a femto BS for a femto cell 102*c*. A BS may support one or multiple (e.g., three) cells. The terms "eNB," "base station," "NR BS," "gNB," "TRP," "AP," "node B," "5G NB," and "cell" may be used interchangeably.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

The wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay station 110*d* may communicate with macro BS 110*a* and a UE 120*d* in order to facilitate communications between the BS 110*a* and UE 120*d*. A relay station may also be referred to as a relay BS, a relay base station, a relay, and/or the like.

The wireless network 100 may be a heterogeneous network that includes BSs of different types, e.g., macro BSs, pico BSs, femto BSs, relay BSs, and/or the like. These different types of BSs may have different transmit power levels, different coverage areas, and different impact on interference in the wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. The network controller 130 may communicate with the BSs via a backhaul. The BSs may also communicate with one another, e.g., directly or indirectly via a wireless or wireline backhaul.

UEs 120 (e.g., 120*a*, 120*b*, 120*c*) may be dispersed throughout the wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communications device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communications (MTC) or evolved or enhanced machine-type communications (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communications link. Some UEs may be considered Internet-of-Things (IoT) devices, and/or may be implemented as NB-IoT (narrowband internet of things) devices. Some UEs may be considered a customer premises equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere as being performed by the base station 110. For example, the base station 110 may configure a UE 120 via downlink control information (DCI), radio resource control (RRC) signaling, a media access control-control element (MAC-CE) or via system information (e.g., a system information block (SIB).

As indicated above, FIG. 1 is provided merely as an example. Other examples may differ from what is described with regard to FIG. 1.

Figure 2:
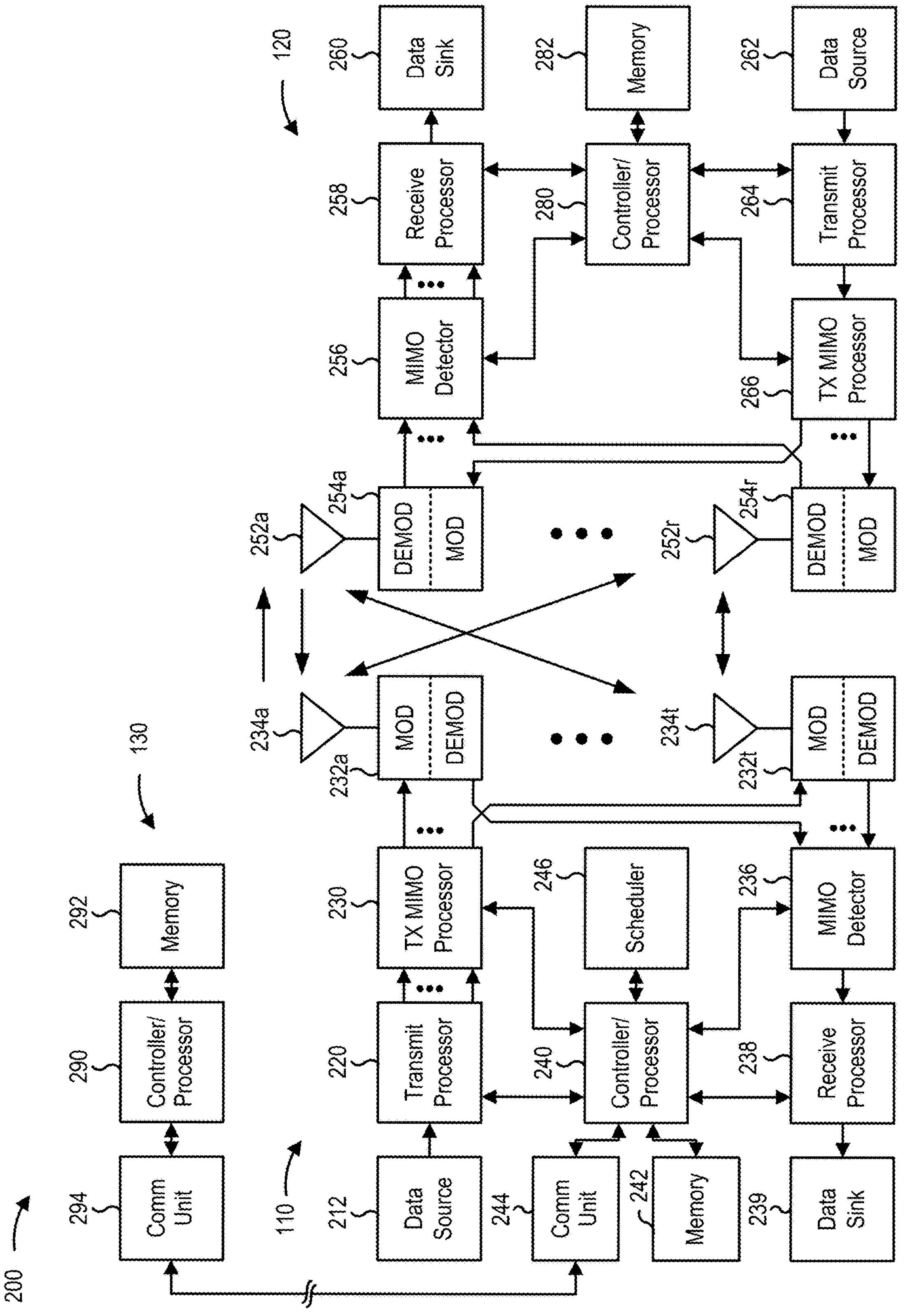
FIG. 2 is a block diagram conceptually illustrating an example of a base station in communication with a user equipment (UE) in a wireless communications network, in accordance with various aspects of the present disclosure.

FIG. 2 shows a block diagram of a design 200 of the base station 110 and UE 120, which may be one of the base stations and one of the UEs in FIG. 1. The base station 110 may be equipped with T antennas 234*a* through 234*t*, and UE 120 may be equipped with R antennas 252*a* through 252*r*, where in general T≥1 and R≥1.

At the base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MC S(s) selected for the UE, and provide data symbols for all UEs. Decreasing the MCS lowers throughput but increases reliability of the transmission. The transmit processor 220 may also process system information (e.g., for semi-static resource partitioning information (SRPI) and/or the like) and control information (e.g., CQI requests, grants, upper layer signaling, and/or the like) and provide overhead symbols and control symbols. The transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for orthogonal frequency division multiplexing (OFDM) and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively. According to various aspects described in more detail below, the synchronization signals can be generated with location encoding to convey additional information.

At the UE 120, antennas 252*a* through 252*r* may receive the downlink signals from the base station 110 and/or other base stations and may provide received signals to demodulators (DEMODs) 254*a* through 254*r*, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for the UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of the UE 120 may be included in a housing.

On the uplink, at the UE 120, a transmit processor 264 may receive and process data from a data source 262 and control information (e.g., for reports comprising RSRP, RSSI, RSRQ, CQI, and/or the like) from the controller/processor 280. Transmit processor 264 may also generate reference symbols for one or more reference signals. The symbols from the transmit processor 264 may be precoded by a TX MIMO processor 266 if applicable, further processed by modulators 254*a* through 254*r* (e.g., for DFT-s-OFDM, CP-OFDM, and/or the like), and transmitted to the base station 110. At the base station 110, the uplink signals from the UE 120 and other UEs may be received by the antennas 234, processed by the demodulators 254, detected by a MIMO detector 236 if applicable, and further processed by a receive processor 238 to obtain decoded data and control information sent by the UE 120. The receive processor 238 may provide the decoded data to a data sink 239 and the decoded control information to a controller/processor 240. The base station 110 may include communications unit 244 and communicate to the network controller 130 via the communications unit 244. The network controller 130 may include a communications unit 294, a controller/processor 290, and a memory 292.

The controller/processor 240 of the base station 110, the controller/processor 280 of the UE 120, and/or any other component(s) of FIG. 2 may perform one or more techniques associated with triggering of machine learning updates, as described in more detail elsewhere. For example, the controller/processor 240 of the base station 110, the controller/processor 280 of the UE 120, and/or any other component(s) of FIG. 2 may perform or direct operations of, for example, the process of FIG. 10 and/or other processes as described. Memories 242 and 282 may store data and program codes for the base station 110 and UE 120, respectively. A scheduler 246 may schedule UEs for data transmission on the downlink and/or uplink.

In some aspects, the UE 120 may include means for receiving, means for training, means for reporting, and/or means for transmitting. Such means may include one or more components of the UE 120 or base station 110 described in connection with FIG. 2.

As indicated above, FIG. 2 is provided merely as an example. Other examples may differ from what is described with regard to FIG. 2.

In some cases, different types of devices supporting different types of applications and/or services may coexist in a cell. Examples of different types of devices include UE handsets, customer premises equipment (CPEs), vehicles, Internet of Things (IoT) devices, and/or the like. Examples of different types of applications include ultra-reliable low-latency communications (URLLC) applications, massive machine-type communications (mMTC) applications, enhanced mobile broadband (eMBB) applications, vehicle-to-anything (V2X) applications, and/or the like. Furthermore, in some cases, a single device may support different applications or services simultaneously.

Figure 3:
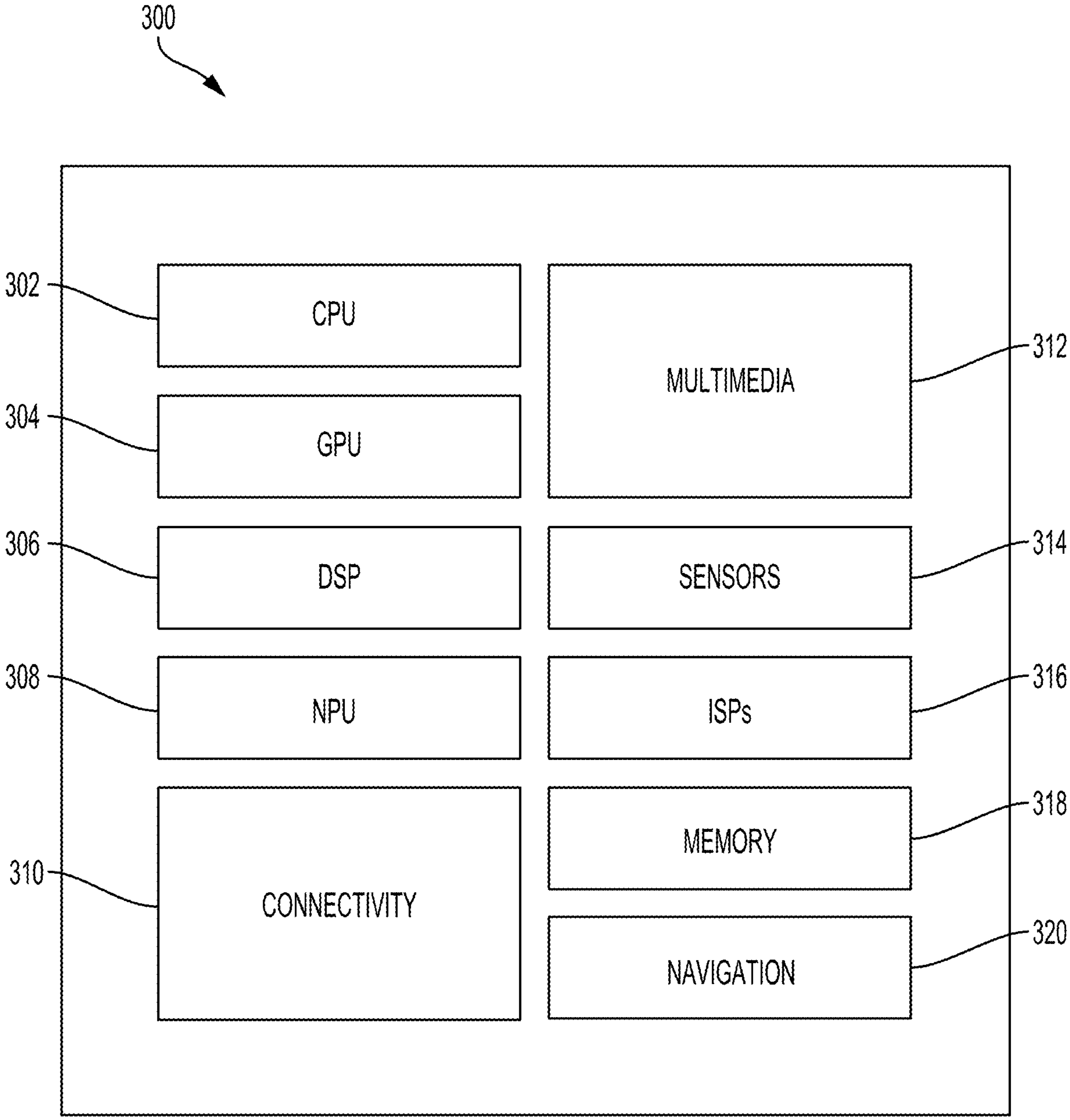
FIG. 3 illustrates an example implementation of designing a neural network using a system-on-a-chip (SOC), including a general-purpose processor, in accordance with certain aspects of the present disclosure.

FIG. 3 illustrates an example implementation of a system-on-a-chip (SOC) 300, which may include a central processing unit (CPU) 302 or a multi-core CPU configured for reporting model updates in response to a trigger, in accordance with certain aspects of the present disclosure. The SOC 300 may be included in the base station 110 or UE 120. Variables (e.g., neural signals and synaptic weights), system parameters associated with a computational device (e.g., neural network with weights), delays, frequency bin information, and task information may be stored in a memory block associated with a neural processing unit (NPU) 308, in a memory block associated with a CPU 302, in a memory block associated with a graphics processing unit (GPU) 304, in a memory block associated with a digital signal processor (DSP) 306, in a memory block 318, or may be distributed across multiple blocks. Instructions executed at the CPU 302 may be loaded from a program memory associated with the CPU 302 or may be loaded from a memory block 318.

The SOC 300 may also include additional processing blocks tailored to specific functions, such as a GPU 304, a DSP 306, a connectivity block 310, which may include fifth generation (5G) connectivity, fourth generation long term evolution (4G LTE) connectivity, Wi-Fi connectivity, USB connectivity, Bluetooth connectivity, and the like, and a multimedia processor 312 that may, for example, detect and recognize gestures. In one implementation, the NPU is implemented in the CPU, DSP, and/or GPU. The SOC 300 may also include a sensor processor 314, image signal processors (ISPs) 316, and/or navigation module 320, which may include a global positioning system.

The SOC 300 may be based on an ARM instruction set. In an aspect of the present disclosure, the instructions loaded into the general-purpose processor 302 may comprise code to receive, from a transmitter, a reference neural network. The general-purpose processor 302 may also comprise code to train the reference neural network to obtain updated neural network parameters for the reference neural network. The general-purpose processor 302 may further comprise code to report to the transmitter in response to a trigger, a difference between the updated neural network parameters and previous neural network parameters for the reference neural network.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 4A:
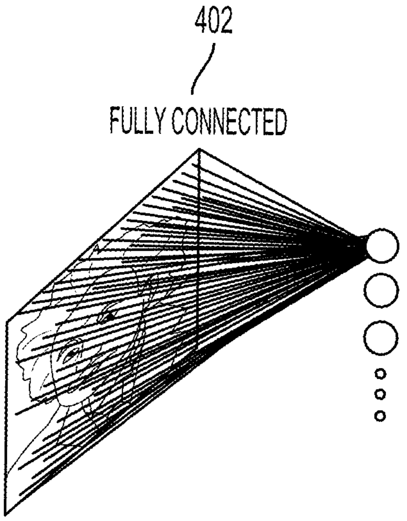
FIGS. 4A, 4B, and 4C are diagrams illustrating a neural network, in accordance with aspects of the present disclosure.
Figure 4B:
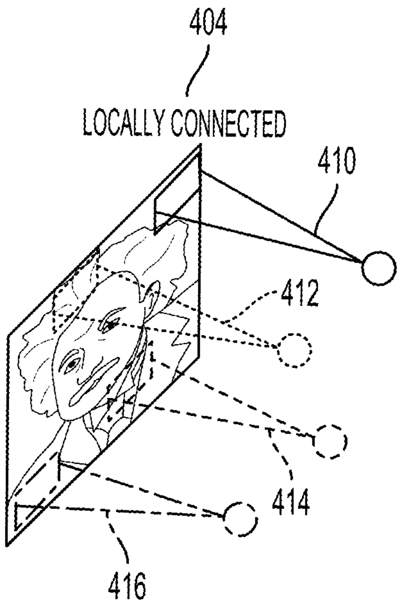

The connections between layers of a neural network may be fully connected or locally connected. FIG. 4A illustrates an example of a fully connected neural network 402. In a fully connected neural network 402, a neuron in a first layer may communicate its output to every neuron in a second layer, so that each neuron in the second layer will receive input from every neuron in the first layer. FIG. 4B illustrates an example of a locally connected neural network 404. In a locally connected neural network 404, a neuron in a first layer may be connected to a limited number of neurons in the second layer. More generally, a locally connected layer of the locally connected neural network 404 may be configured so that each neuron in a layer will have the same or a similar connectivity pattern, but with connections strengths that may have different values (e.g., 410, 412, 414, and 416). The locally connected connectivity pattern may give rise to spatially distinct receptive fields in a higher layer, because the higher layer neurons in a given region may receive inputs that are tuned through training to the properties of a restricted portion of the total input to the network.

Figure 4C:
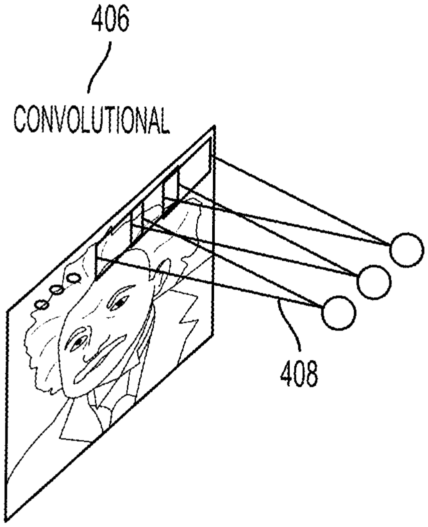

One example of a locally connected neural network is a convolutional neural network. FIG. 4C illustrates an example of a convolutional neural network 406. The convolutional neural network 406 may be configured such that the connection strengths associated with the inputs for each neuron in the second layer are shared (e.g., 408). Convolutional neural networks may be well suited to problems in which the spatial location of inputs is meaningful.

Figure 4D:
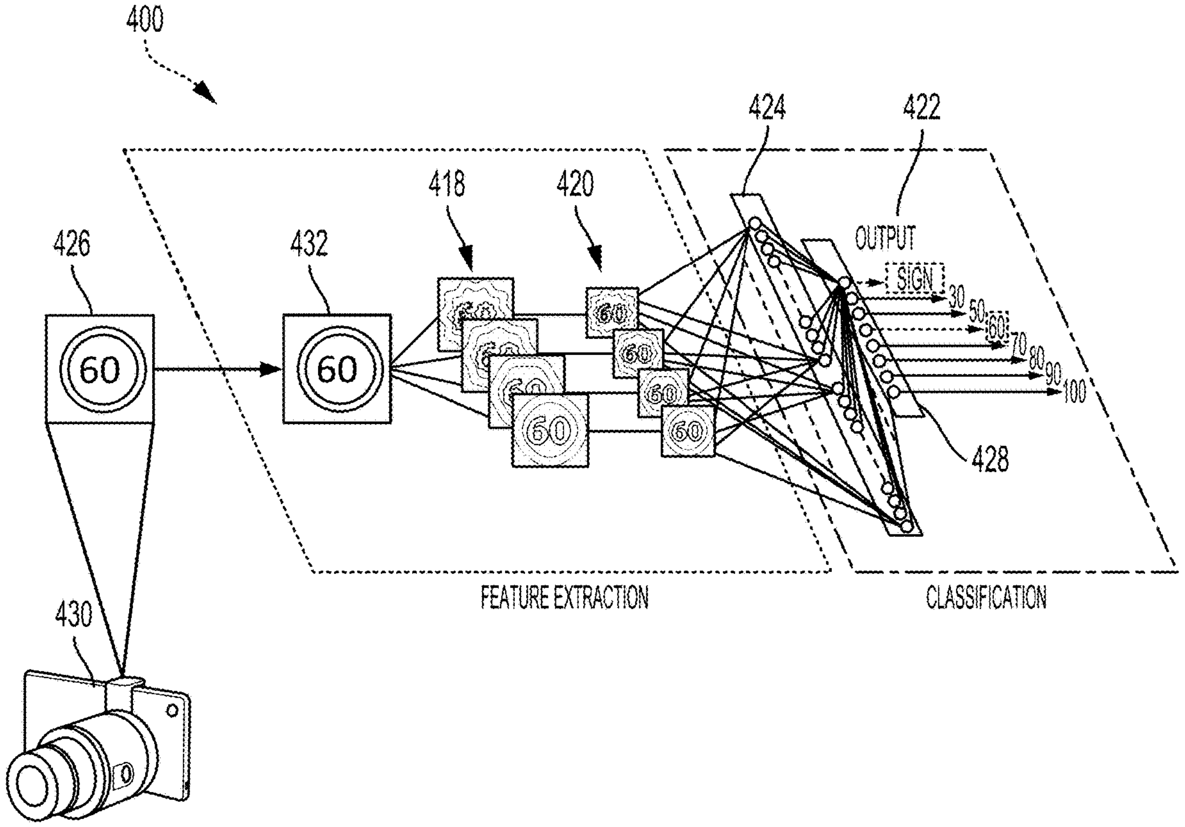
FIG. 4D is a diagram illustrating an exemplary deep convolutional network (DCN), in accordance with aspects of the present disclosure.

One type of convolutional neural network is a deep convolutional network (DCN). FIG. 4D illustrates a detailed example of a DCN 400 designed to recognize visual features from an image 426 input from an image capturing device 430, such as a car-mounted camera. The DCN 400 of the current example may be trained to identify traffic signs and a number provided on the traffic sign. Of course, the DCN 400 may be trained for other tasks, such as identifying lane markings or identifying traffic lights.

The DCN 400 may be trained with supervised learning. During training, the DCN 400 may be presented with an image, such as the image 426 of a speed limit sign, and a forward pass may then be computed to produce an output 422. The DCN 400 may include a feature extraction section and a classification section. Upon receiving the image 426, a convolutional layer 432 may apply convolutional kernels (not shown) to the image 426 to generate a first set of feature maps 418. As an example, the convolutional kernel for the convolutional layer 432 may be a 5×5 kernel that generates 28×28 feature maps. In the present example, because four different feature maps are generated in the first set of feature maps 418, four different convolutional kernels were applied to the image 426 at the convolutional layer 432. The convolutional kernels may also be referred to as filters or convolutional filters.

The first set of feature maps 418 may be subsampled by a max pooling layer (not shown) to generate a second set of feature maps 420. The max pooling layer reduces the size of the first set of feature maps 418. That is, a size of the second set of feature maps 420, such as 14×14, is less than the size of the first set of feature maps 418, such as 28×28. The reduced size provides similar information to a subsequent layer while reducing memory consumption. The second set of feature maps 420 may be further convolved via one or more subsequent convolutional layers (not shown) to generate one or more subsequent sets of feature maps (not shown).

In the example of FIG. 4D, the second set of feature maps 420 is convolved to generate a first feature vector 424. Furthermore, the first feature vector 424 is further convolved to generate a second feature vector 428. Each feature of the second feature vector 428 may include a number that corresponds to a possible feature of the image 426, such as "sign," "60," and "100." A softmax function (not shown) may convert the numbers in the second feature vector 428 to a probability. As such, an output 422 of the DCN 400 is a probability of the image 426 including one or more features.

In the present example, the probabilities in the output 422 for "sign" and "60" are higher than the probabilities of the others of the output 422, such as "30," "40," "50," "70," "80," "90," and "100". Before training, the output 422 produced by the DCN 400 is likely to be incorrect. Thus, an error may be calculated between the output 422 and a target output. The target output is the ground truth of the image 426 (e.g., "sign" and "60"). The weights of the DCN 400 may then be adjusted so the output 422 of the DCN 400 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images (e.g., the speed limit sign of the image 426) and a forward pass through the network may yield an output 422 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0, x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 5:
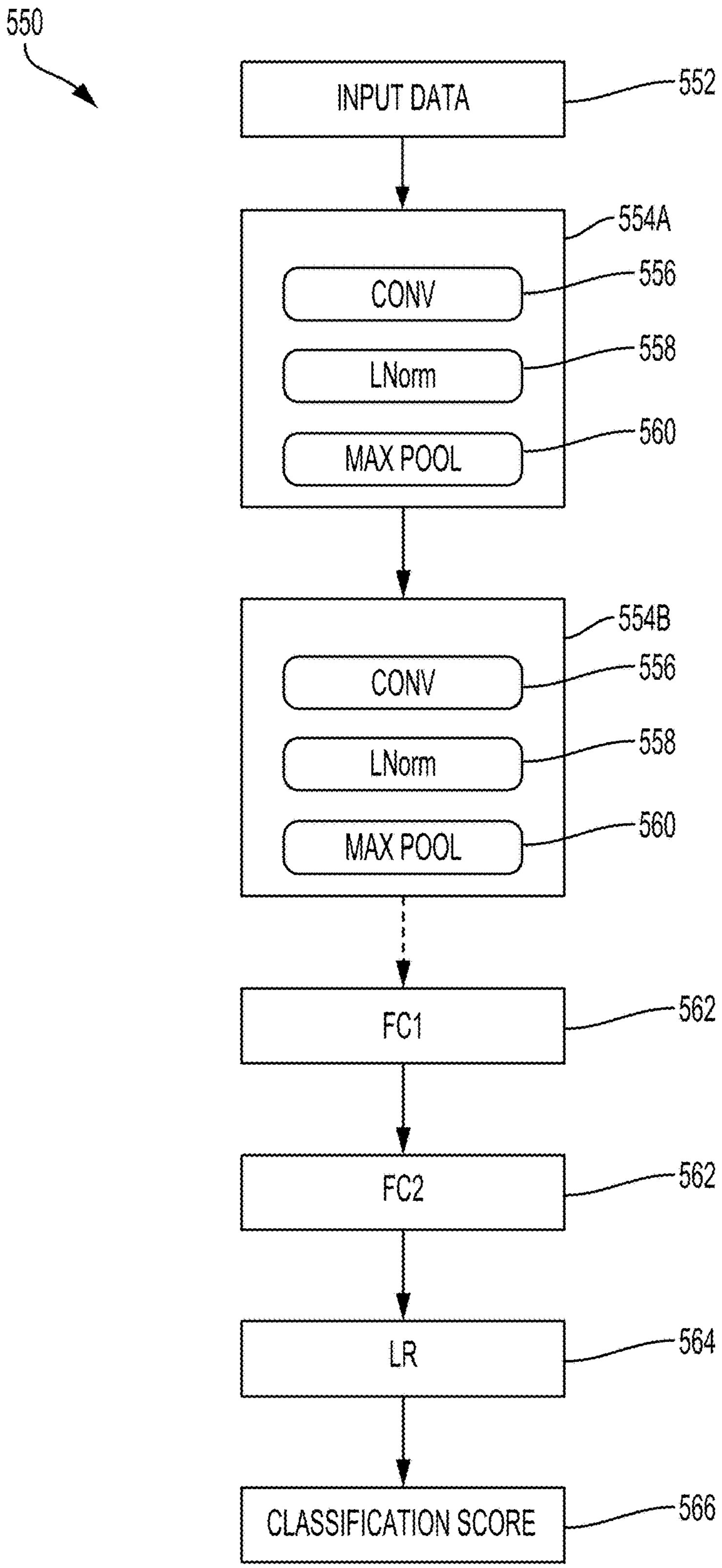
FIG. 5 is a block diagram illustrating an exemplary deep convolutional network (DCN), in accordance with aspects of the present disclosure.

FIG. 5 is a block diagram illustrating a deep convolutional network 550. The deep convolutional network 550 may include multiple different types of layers based on connectivity and weight sharing. As shown in FIG. 5, the deep convolutional network 550 includes the convolution blocks 554A, 554B. Each of the convolution blocks 554A, 554B may be configured with a convolution layer (CONV) 356, a normalization layer (LNorm) 558, and a max pooling layer (MAX POOL) 560.

The convolution layers 556 may include one or more convolutional filters, which may be applied to the input data to generate a feature map. Although only two of the convolution blocks 554A, 554B are shown, the present disclosure is not so limiting, and instead, any number of the convolution blocks 554A, 554B may be included in the deep convolutional network 550 according to design preference. The normalization layer 558 may normalize the output of the convolution filters. For example, the normalization layer 558 may provide whitening or lateral inhibition. The max pooling layer 560 may provide down sampling aggregation over space for local invariance and dimensionality reduction.

The parallel filter banks, for example, of a deep convolutional network may be loaded on a CPU 302 or GPU 304 of an SOC 300 to achieve high performance and low power consumption. In alternative embodiments, the parallel filter banks may be loaded on the DSP 306 or an ISP 316 of an SOC 300. In addition, the deep convolutional network 550 may access other processing blocks that may be present on the SOC 300, such as sensor processor 314 and navigation module 320, dedicated, respectively, to sensors and navigation.

The deep convolutional network 550 may also include one or more fully connected layers 562 (FC1 and FC2). The deep convolutional network 550 may further include a logistic regression (LR) layer 564. Between each layer 556, 558, 560, 562, 564 of the deep convolutional network 550 are weights (not shown) that are to be updated. The output of each of the layers (e.g., 556, 558, 560, 562, 564) may serve as an input of a succeeding one of the layers (e.g., 556, 558, 560, 562, 564) in the deep convolutional network 550 to learn hierarchical feature representations from input data 552 (e.g., images, audio, video, sensor data and/or other input data) supplied at the first of the convolution blocks 554A. The output of the deep convolutional network 550 is a classification score 566 for the input data 552. The classification score 566 may be a set of probabilities, where each probability is the probability of the input data, including a feature from a set of features.

As indicated above, FIGS. 3-5 are provided as examples. Other examples may differ from what is described with respect to FIGS. 3-5.

A machine learning (ML) model, such as the deep convolutional network 550, may be generated at a network and then transmitted to a user equipment (UE) for further training. Although the present description primarily discusses the model originating at the network, (sometimes referred to as a base station or gNB), the present disclosure contemplates the opposite. That is, the present disclosure also is intended to cover the base station sending model updates to the UE for a UE originated model.

Figure 6:
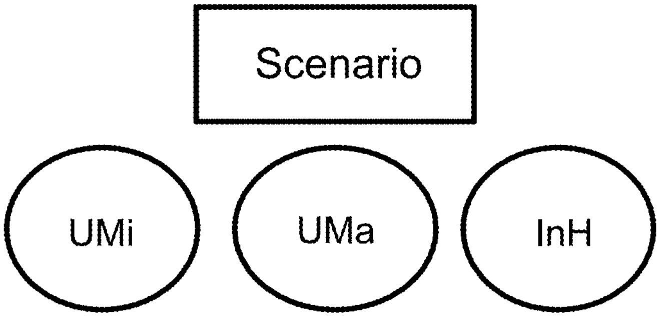
FIG. 6 is a block diagram illustrating scenario specific models, in accordance with aspects of the present disclosure.

The machine learning model transmitted by the network can be scenario specific. FIG. 6 is a block diagram illustrating scenario specific models, in accordance with aspects of the present disclosure. In the example shown in FIG. 6, different scenarios correspond to different channel models. Each scenario has its own sub-model. Example sub-models include an urban micro (UMi) model, an urban macro (Uma) model, and an indoor hot spot (InH) model. The different sub-models may be the same model with different parameters, or may be different models with different structures (e.g., number of layers or number of neurons with a layer). In some cases, the network may request an update to a particular sub-model instead of the full model. For example, a full model update may not be feasible in some radio conditions. Moreover, signaling overhead should be considered when requesting a model update.

Figure 7:
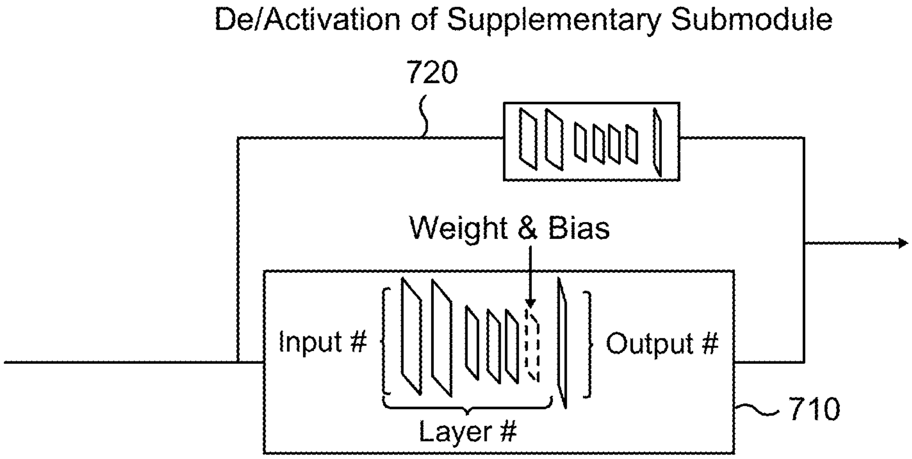
FIG. 7 is a block diagram illustrating sub-model updating, in accordance with aspects of the present disclosure.

FIG. 7 is a block diagram illustrating sub-model updating, in accordance with aspects of the present disclosure. A neural network model 710 includes multiple neural network layers, along with a set of weights and biases. An input is processed by the layers, weights, and biases and is output. In parallel with the neural network model 710 is a supplementary submodule 720. The supplementary submodule 720 may be activated or deactivated to adjust the overall output of neural network model 710.

Figure 8:
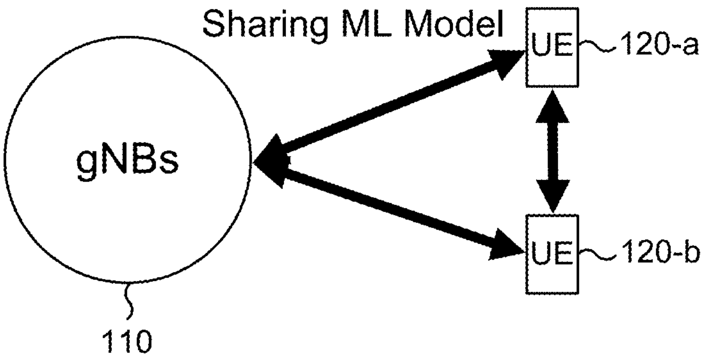
FIG. 8 is a block diagram illustrating sharing of a machine learning model, in accordance with aspects of the present disclosure.

FIG. 8 is a block diagram illustrating sharing of a machine learning model, in accordance with aspects of the present disclosure. After a UE 120*a* receives a model from a network node (e.g., gNB) 110, the UE 120*a* may perform online training for the model. In some cases, the initial model is trained offline by the network node 110, with the expectation that the UEs 120*a*, 120*b* will fine tune the model based on the conditions experienced by the UEs 120*a*, 120*b*. Based on the training, the UE 120*a* may send a model update. For example, based on detected environment changes or after initial online training by the UE 120*a*, the UE 120*a* may upload model updates to the network node 110 and/or share the model updates to the UE 120*b*. In some aspects, the UE 120*a* detects environment changes and looks for a new model or model updates from similar types of UEs in the neighborhood, such as the UE 120*b*. The UE 120*b* may then leverage the learned models, for example in a sidelink scenario. The network node 110 may share updates received from one UE 120*a* with another UE 120*b*.

A large amount of data is involved when exchanging parameters of the trained neural network between the UEs 120 and the network node 110. In some cases, the size of a neural network may be very large, and it may not be possible and/or efficient for the UE 120 to upload the entire trained artificial intelligence (AI) module with each update.

Aspects of the present disclosure reduce over-the-air transmissions needed for a machine learning model update. In some aspects of the present disclosure, the base station may explicitly ask the UE to train and report only "a part" of a pre-trained neural network (NN), as opposed to the whole neural network. In general, there may be two types of UE reports, a full model upload or a differential model upload. The following discussion primarily focuses on a differential model upload. "A part" may refer to a given set of neural network layers (e.g., final k layers), a sub-module of the artificial intelligence (AI) module, or a set of parameters (e.g., weights and biases of the network), for example.

The base station may provide the UE with a pre-trained model. The base station may later ask the UE to only train a few layers, and report the parameters for the trained layers. Training a few layers of the neural network is referred to as transfer learning. The base station may alternatively, or in addition, request updates based on changed network parameters for the entire neural network.

In some aspects, an initial set of parameters for the neural network is derived during offline training. The UE and/or network may generate the updates during an online training process, for example, to account for a particular environment in which the apparatus is deployed. Thus, the parameters may evolve over time, triggering an update to the parameters. After receiving the updates, the network may share the updates with other UEs.

In some aspects of the present disclosure, the UE may report model changes over time, as the UE updates the machine learning model, as opposed to reporting the whole neural network at each model update instance. A reference model may be a pre-trained model sent by the base station or a first pre-trained model sent by the UE to the base station. Subsequent model updates may be based on a differential model upload with respect to the reference model. That is, only part of the neural network that has changed compared to a reference model is transmitted. In some aspects, the reference model may be the model uploaded at the previous model upload instance. Both the UE and the base station should be aware of which model is the reference model. The model upload could be periodic or triggered by the UE or base station. If the updates are periodic, periodic resources may be configured. If the network has not changed much since the last update, these resources may be wasted because the updates may be insignificant.

Aspects of the present disclosure are directed to a UE or base station sending an updated neural network in a differential manner based on a triggering event. As described, a UE may report model changes over time, as the UE updates the machine learning model, as opposed to reporting the whole neural network at each model update instance. The subsequent model updates may be based on a differential model upload with respect to a reference model (e.g., pre-trained model sent by the network or a first pre-trained model sent by the UE to the network). For example, if the initial set of parameters for the neural network is $w_1$, and a second set of parameters for the neural network is $w_2$, the UE or network will report $w_2-w_1$, as opposed to $w_2$, to reduce the signaling overhead. In some aspects, the reference model for this differential model update may be the previous reporting instance.

According to aspects of the present disclosure, a triggering condition for the differential model update may be based on a loss function for training the neural network. For example, if the loss function decreases below a threshold or the rate of decrease of the loss function drops below a threshold, a model update may be triggered. That is, if an amount of fine tuning during training becomes small enough that the network is no longer changing much during training, the updates may be ready for sending. Thus, the UE may transmit a scheduling request to receive a resource allocation for transmission of the update.

In other aspects, the triggering condition may be a function of an amount of change in the transmitted parameters of the neural network. This change metric may be measured, for example, in terms of an L1-norm or L2-norm of the difference between the current and previously reported neural network parameters. This change in the parameters is relevant as long as the change translates into change in the overall performance of the neural network. In other words, the update should occur when a change in parameters is significant enough to affect network performance by some threshold amount. According to aspects of the present disclosure, when the UE sends an update, the UE transmits a scheduling request to receive an allocation of resources for transmitting the update.

Figure 9:
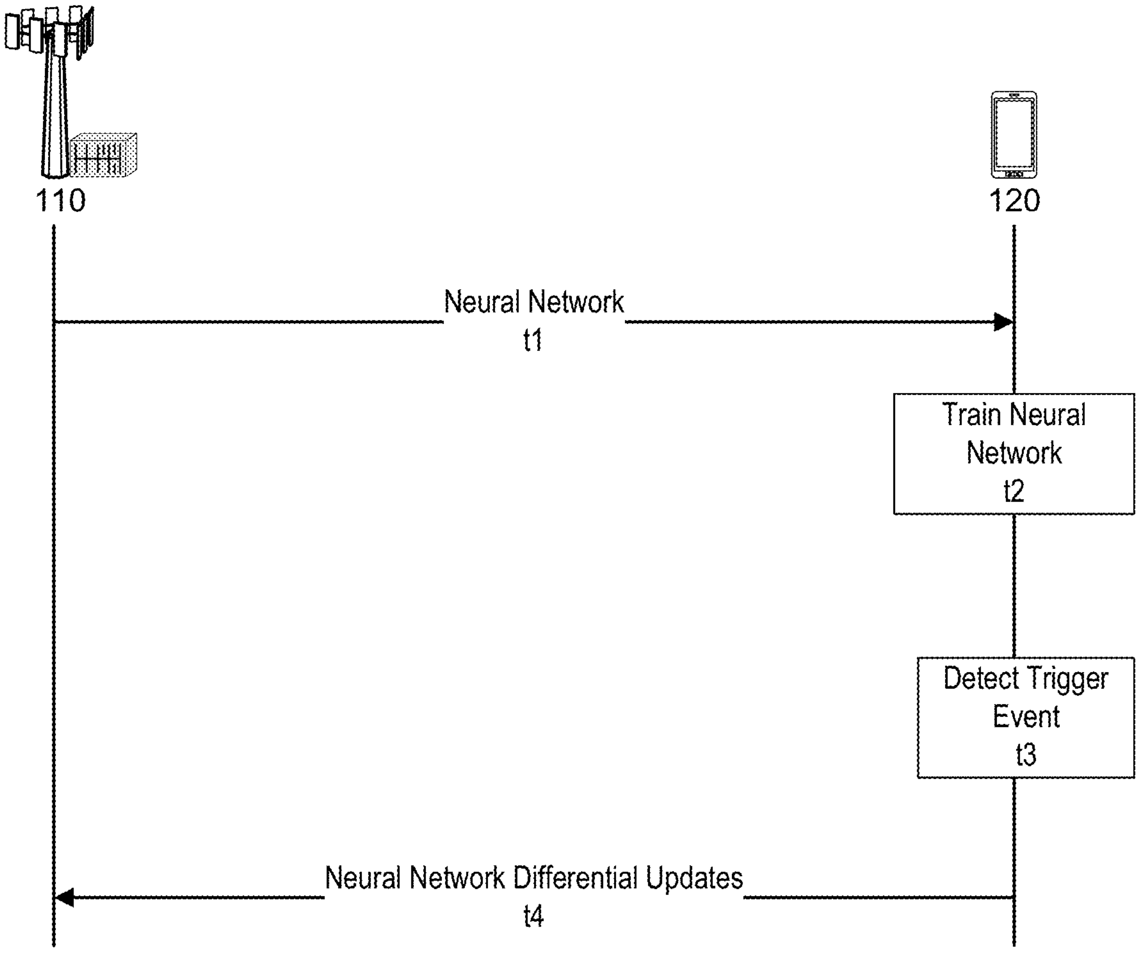
FIG. 9 is a timing diagram illustrating differential updating of a machine learning model based on a trigger, in accordance with aspects of the present disclosure.

FIG. 9 is a timing diagram illustrating differential updating of a machine learning model based on a trigger, in accordance with aspects of the present disclosure. Although the following example is with respect to the reference model originating from the base station, the reverse scenario is also contemplated. At time t1, a base station 110 transmits a pre-trained neural network to a UE 120. At time t2, the UE 120 further trains the neural network, in some cases with online training.

At time t3, the UE 120 detects a trigger event for sending updated parameters to the base station 110, based on the UE training. The trigger condition may be based on a loss function for training the neural network or an L1 or L2 norm of a difference in parameters. The parameters may be weights or biases of the entire neural network, for example. In other aspects, the parameters are only for portions of the neural network trained by the UE, for example, the last few layers of the neural network, in a transfer learning scenario. In these aspects, the UE may transmit structural changes for these last few layers. In still other aspects, the parameters are for particular sub-models. At time t4, the UE 120 transmits the updates to the base station 110.

Figure 10:
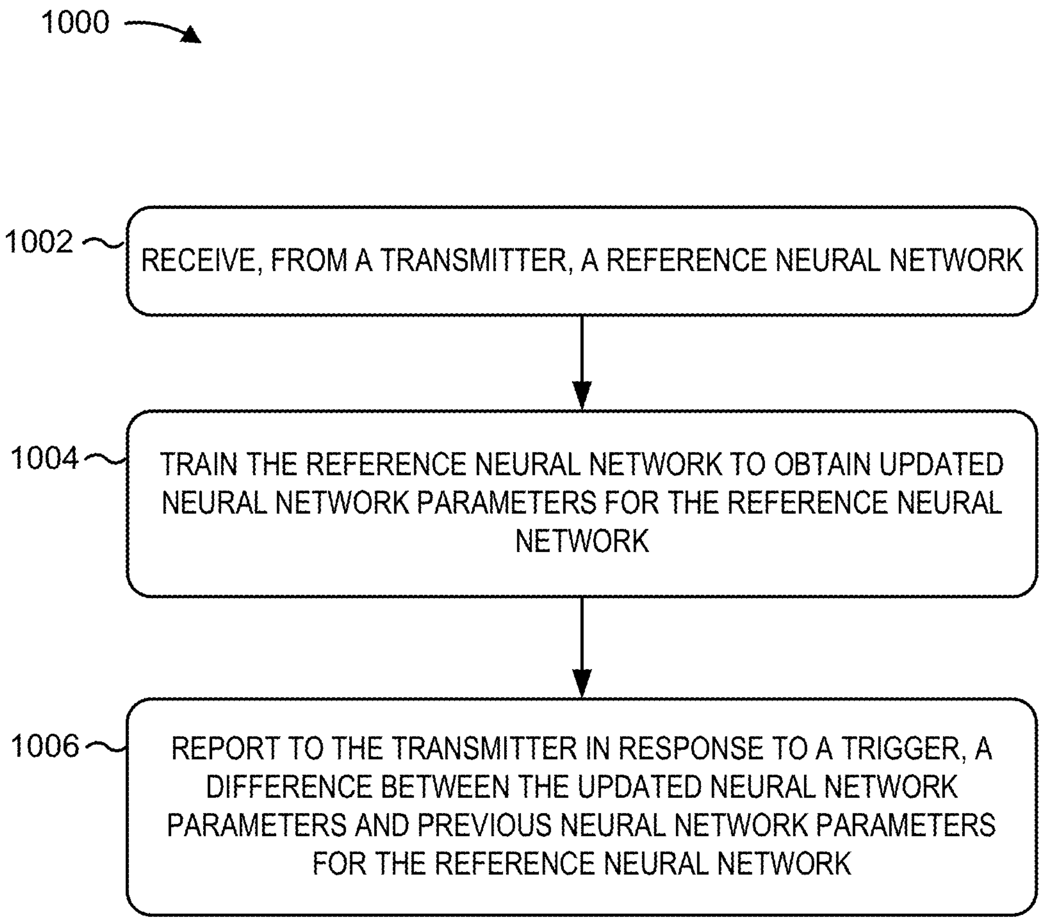
FIG. 10 is a flow diagram illustrating an example process performed, for example, by a receiver, in accordance with various aspects of the present disclosure.

FIG. 10 is a flow diagram illustrating an example process 1000 performed, for example, by a receiver, in accordance with various aspects of the present disclosure. The example process 1000 is an example of reporting for machine learning model updates.

As shown in FIG. 10, in some aspects, the process 1000 may include receiving, from a transmitter, a reference neural network (block 1002). For example, the user equipment (UE) (e.g., using the antenna 252, DEMOD/MOD 254, MIMO detector 256, receive processor 258, controller/processor 280, and/or memory 282) can receive, from the transmitter, a reference neural network. In some aspects, a first portion of the reference neural network is already trained and a second portion is not trained. In some aspects, the transmitter is a base station and the receiver is a UE. In other aspects, the transmitter is a UE and the receiver is a base station.

The process 1000 may also include training the reference neural network to obtain updated neural network parameters for the reference neural network (block 1004). For example, the UE (e.g., using the antenna 252, DEMOD/MOD 254, TX MIMO processor 266, transmit processor 264, controller/processor 280, and/or memory 282) can train the reference neural network. In some aspects, the updated neural network parameters are for only a portion of the reference neural network, such as a subset of neural network layers. In other aspects, the updated neural network parameters are for a sub-module of the reference neural network.

The process 1000 may further include reporting to the transmitter in response to a trigger, a difference between the updated neural network parameters and previous neural network parameters for the reference neural network (block 1006). For example, the UE (e.g., using the antenna 252, DEMOD/MOD 254, TX MIMO processor 266, transmit processor 264, controller/processor 280, and/or memory 282) can report to the transmitter. In some aspects, the trigger condition may be based on a loss function for training the neural network or an L1 or L2 norm of a difference in parameters. For example, the trigger may occur when the loss function is less than a threshold value. Or, the trigger may based on a magnitude of the difference between the updated neural network parameters and the previous neural network parameters. The magnitude may be based on an L1 norm of the difference or an L2 norm of the difference. In still other aspects, the trigger is based on a difference between performance of the reference neural network with the updated neural network parameters and performance of the reference neural network with the previous neural network parameters.

Example Aspects

Aspect 1: A method of wireless communication, by a receiver, comprising: receiving, from a transmitter, a reference neural network; training the reference neural network to obtain updated neural network parameters for the reference neural network; and reporting to the transmitter in response to a trigger, a difference between the updated neural network parameters and previous neural network parameters for the reference neural network.

Aspect 2: The method of Aspect 1, in which the trigger is based on a loss function applied during training.

Aspect 3: The method of Aspect 2, in which the trigger occurs when the loss function is less than a threshold value.

Aspect 4: The method of any of the preceding Aspects, in which the trigger is based on a magnitude of the difference between the updated neural network parameters and the previous neural network parameters.

Aspect 5: The method of Aspect 4, in which the magnitude is based on an L1 norm of the difference.

Aspect 6: The method of Aspect 4, in which the magnitude is based on an L2 norm of the difference.

Aspect 7: The method of any of preceding Aspects 1-3, 5, or 6, in which the trigger is based on a difference between performance of the reference neural network with the updated neural network parameters and performance of the reference neural network with the previous neural network parameters.

Aspect 8: The method of any of the preceding Aspects, further comprising: transmitting a scheduling request; and reporting in accordance with resources allocated in response to the scheduling request.

Aspect 9: The method of any of the preceding Aspects, in which the updated neural network parameters comprise neural network weights and neural network biases.

Aspect 10: The method of any of the preceding Aspects, in which the updated neural network parameters are for only a portion of the reference neural network, the portion comprising a subset of neural network layers.

Aspect 11: The method of any of the preceding Aspects, in which the updated neural network parameters are for a sub-module of the reference neural network.

Aspect 12: The method of any of the preceding Aspects, further comprising receiving, from the transmitter, the reference neural network, which includes a first portion that is already trained and a second portion that is not trained.

Aspect 13: The method of any of the preceding Aspects, in which the transmitter comprises a base station and the receiver comprises a user equipment (UE).

Aspect 14: The method of any of Aspects 1-12, in which the receiver comprises a base station and the transmitter comprises a user equipment (UE).

Aspect 15: An apparatus for wireless communications by a receiver, comprising: at least one processor; memory coupled with the at least one processor; and instructions stored in the memory and operable, when executed by the at least one processor, to cause the apparatus: to receive, from a transmitter, a reference neural network; to train the reference neural network to obtain updated neural network parameters for the reference neural network; and to report to the transmitter in response to a trigger, a difference between the updated neural network parameters and previous neural network parameters for the reference neural network.

Aspect 16: The apparatus of Aspect 15, in which the trigger is based on a loss function applied during training.

Aspect 17: The apparatus of Aspect 16, in which the trigger occurs when the loss function is less than a threshold value.

Aspect 18: The apparatus of any of the Aspects 15-17, in which the trigger is based on a magnitude of the difference between the updated neural network parameters and the previous neural network parameters.

Aspect 19: The apparatus of Aspect 18, in which the magnitude is based on an L1 norm of the difference.

Aspect 20: The apparatus of Aspect 18, in which the magnitude is based on an L2 norm of the difference.

Aspect 21: The apparatus of any of the Aspects 15-17, 19, or 20, in which the trigger is based on a difference between performance of the reference neural network with the updated neural network parameters and performance of the reference neural network with the previous neural network parameters.

Aspect 22: The apparatus of any of the Aspects 15-21, in which the at least one processor causes the apparatus: to transmit a scheduling request; and to report in accordance with resources allocated in response to the scheduling request.

Aspect 23: The apparatus of any of the Aspects 15-22, in which the updated neural network parameters comprise neural network weights and neural network biases.

Aspect 24: The apparatus of any of the Aspects 15-23, in which the updated neural network parameters are for only a portion of the reference neural network, the portion comprising a subset of neural network layers.

Aspect 25: The apparatus of any of the Aspects 15-24, in which the updated neural network parameters are for a sub-module of the reference neural network.

Aspect 26: The apparatus of any of the Aspects 15-25, in which the at least one processor causes the apparatus to receive, from the transmitter, the reference neural network, which includes a first portion that is already trained and a second portion that is not trained.

Aspect 27: The apparatus of any of the Aspects 15-26, in which the transmitter comprises a base station and the receiver comprises a user equipment (UE).

Aspect 28: The apparatus of any of Aspects 15-27, in which the receiver comprises a base station and the transmitter comprises a user equipment (UE).

Aspect 29: An apparatus, comprising: means for receiving, from a transmitter, a reference neural network; means for training the reference neural network to obtain updated neural network parameters for the reference neural network; and means for reporting to the transmitter in response to a trigger, a difference between the updated neural network parameters and previous neural network parameters for the reference neural network.

Aspect 30: The apparatus of Aspect 29, in which the trigger is based on a loss function applied during training.

The foregoing disclosure provides illustration and description, but is not intended to be exhaustive or to limit the aspects to the precise form disclosed. Modifications and variations may be made in light of the above disclosure or may be acquired from practice of the aspects.

As used, the term "component" is intended to be broadly construed as hardware, firmware, and/or a combination of hardware and software. As used, a processor is implemented in hardware, firmware, and/or a combination of hardware and software.

Some aspects are described in connection with thresholds. As used, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described may be implemented in different forms of hardware, firmware, and/or a combination of hardware and software. The actual specialized control hardware or software code used to implement these systems and/or methods is not limiting of the aspects. Thus, the operation and behavior of the systems and/or methods were described without reference to specific software code—it being understood that software and hardware can be designed to implement the systems and/or methods based, at least in part, on the description.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used should be construed as critical or essential unless explicitly described as such. Also, as used, the articles "a" and "an" are intended to include one or more items, and may be used interchangeably with "one or more." Furthermore, as used, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used, the terms "has," "have," "having," and/or the like are intended to be open-ended terms. Further, the phrase "based on" is intended to mean "based, at least in part, on" unless explicitly stated otherwise.

What is claimed is:

1. A method of wireless communication, by a receiver, comprising:

receiving, from a transmitter, a reference neural network comprising a trained first portion and an untrained second portion;

receiving a request to train only a subset of neural network layers of the reference neural network, the subset of neural network layers comprising the untrained second portion and excludes the trained first portion;

training only the subset of the neural network layers of the reference neural network to obtain updated neural network parameters for the subset of the neural network layers of the reference neural network while maintaining the trained first portion unchanged;

transmitting a scheduling request in response to a trigger based on at least one of a rate of decrease of a loss function applied during the training falling below a threshold value or a magnitude of a difference between the updated neural network parameters and previous neural network parameters for the subset of the neural network layers of the reference neural network exceeding a threshold; and reporting to the transmitter, using resources allocated in response to the scheduling request, the difference between the updated neural network parameters and the previous neural network parameters for the subset of the neural network layers of the reference neural network.

2. The method of claim 1, in which the trigger is based on the loss function applied during training.

3. The method of claim 2, in which the trigger occurs when the loss function is less than the threshold value.

4. The method of claim 1, in which the trigger is based on the magnitude of the difference between the updated neural network parameters and the previous neural network parameters.

5. The method of claim 4, in which the magnitude is based on an L1 norm of the difference.

6. The method of claim 4, in which the magnitude is based on an L2 norm of the difference.

7. The method of claim 1, in which the trigger is based on a difference between performance of the reference neural network with the updated neural network parameters and performance of the reference neural network with the previous neural network parameters.

8. The method of claim 1, in which the updated neural network parameters comprise neural network weights and neural network biases.

9. The method of claim 1, in which the transmitter comprises a base station and the receiver comprises a user equipment (UE).

10. The method of claim 1, in which the receiver comprises a base station and the transmitter comprises a user equipment (UE).

11. An apparatus for wireless communications by a receiver, comprising:

at least one processor;

memory coupled with the at least one processor; and instructions stored in the memory and operable, when executed by the at least one processor, to cause the apparatus:

to receive, from a transmitter, a reference neural network comprising a trained first portion and an untrained second portion;

to receive a request to train only a subset of neural network layers of the reference neural network, the subset of neural network layers comprising the untrained second portion and excludes the trained first portion;

to train only the subset of the neural network layers of the reference neural network to obtain updated neural network parameters for the subset of the neural network layers of the reference neural network while maintaining the trained first portion unchanged;

to transmit a scheduling request in response to a trigger based on at least one of a rate of decrease of a loss function applied during the training falling below a threshold value or a magnitude of a difference between the updated neural network parameters and previous neural network parameters for the subset of the neural network layers of the reference neural network exceeding a threshold; and to report to the transmitter, using resources allocated in response to the scheduling request, the difference between the updated neural network parameters and the previous neural network parameters for the subset of the neural network layers of the reference neural network.

12. The apparatus of claim 11, in which the trigger is based on the loss function applied during training.

13. The apparatus of claim 12, in which the trigger occurs when the loss function is less than the threshold value.

14. The apparatus of claim 11, in which the trigger is based on the magnitude of the difference between the updated neural network parameters and the previous neural network parameters.

15. The apparatus of claim 14, in which the magnitude is based on an L1 norm of the difference.

16. The apparatus of claim 14, in which the magnitude is based on an L2 norm of the difference.

17. The apparatus of claim 11, in which the trigger is based on a difference between performance of the reference neural network with the updated neural network parameters and performance of the reference neural network with the previous neural network parameters.

18. The apparatus of claim 11, in which the updated neural network parameters comprise neural network weights and neural network biases.

19. The apparatus of claim 11, in which the transmitter comprises a base station and the receiver comprises a user equipment (UE).

20. The apparatus of claim 11, in which the receiver comprises a base station and the transmitter comprises a user equipment (UE).

21. A non-transitory computer-readable medium storing code for wireless communication by a receiver, the code comprising instructions executable by a processor to:

receive, from a transmitter, a reference neural network comprising a trained first portion and an untrained second portion;

receive a request to train only a subset of neural network layers of the reference neural network, the subset of neural network layers comprising the untrained second portion and excludes the trained first portion;

train only the subset of the neural network layers of the reference neural network to obtain updated neural network parameters for the subset of the neural network layers of the reference neural network while maintaining the trained first portion unchanged;

transmit a scheduling request in response to a trigger based on at least one of a rate of decrease of a loss function applied during the training falling below a threshold value or a magnitude of a difference between the updated neural network parameters and previous neural network parameters for the subset of the neural network layers of the reference neural network exceeding a threshold; and report to the transmitter, using resources allocated in response to the scheduling request, the difference between the updated neural network parameters and the previous neural network parameters for the subset of the neural network layers of the reference neural network.

22. The apparatus of claim 21, in which the trigger is based on the loss function applied during training.

* * * * *